Figure 4:
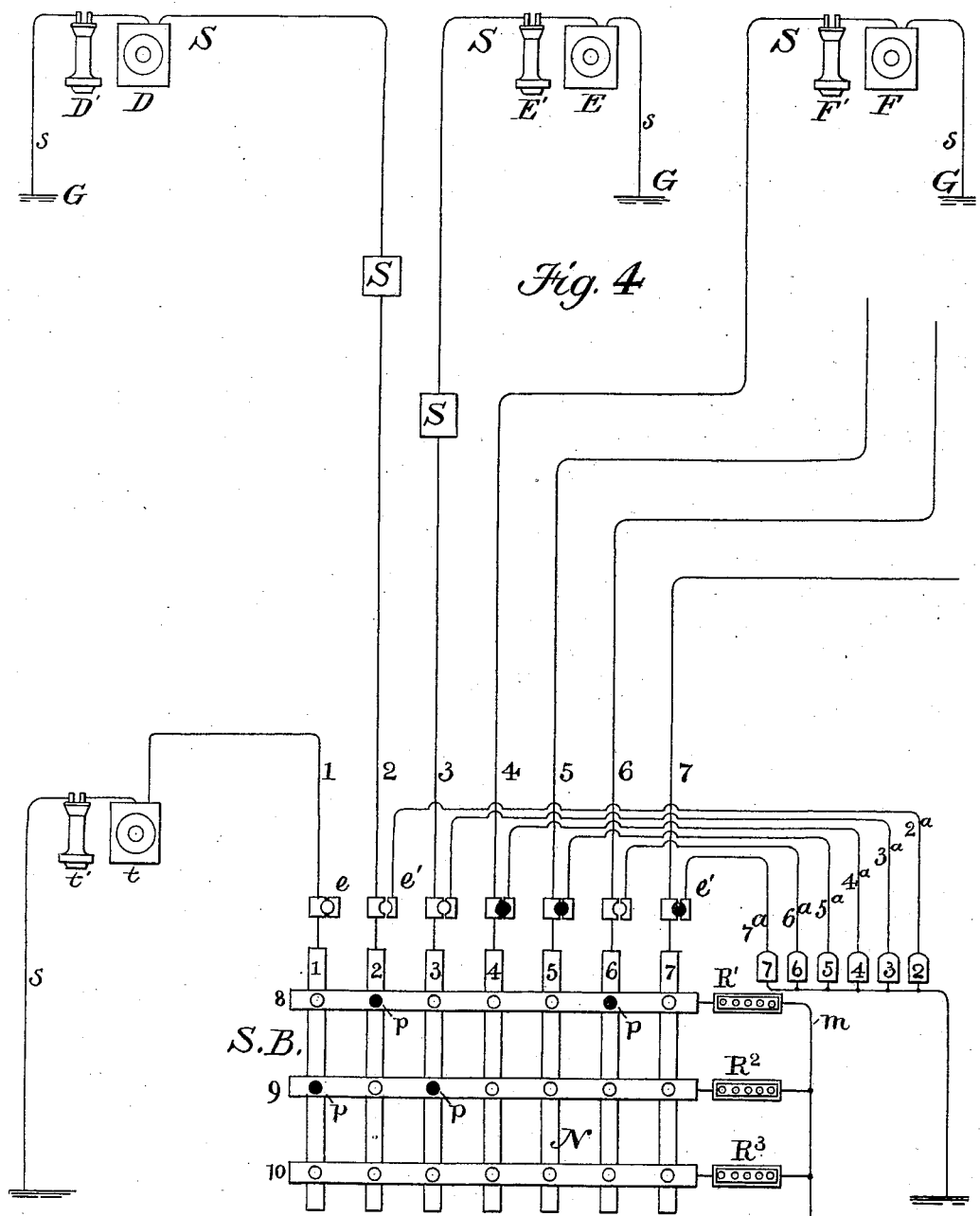

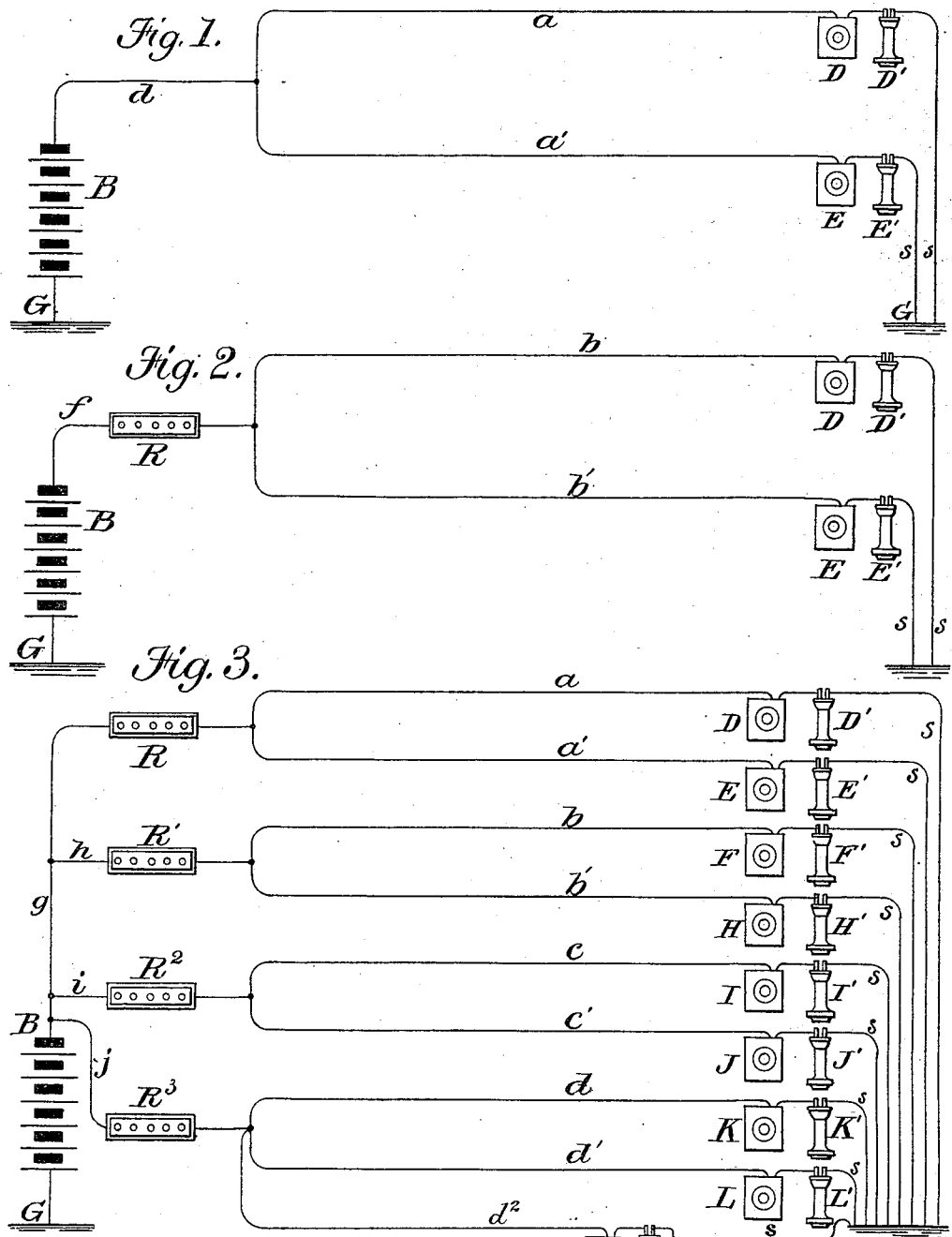

(No Model.) 2 Sheets—Sheet 2.
C. A. BELL.
SYSTEM OF TELEPHONIC COMMUNICATION.
No. 346,708. Patented Aug. 3, 1886.

Witnesses.
Geo Willis Pierce
Philip hauro

Inventor.
Chichester A. Bell by
A. Pollok
his attorney.

UNITED STATES PATENT OFFICE.

CHICHESTER A. BELL, OF LONDON, COUNTY OF MIDDLESEX, ENGLAND.

SYSTEM OF TELEPHONIC COMMUNICATION.

SPECIFICATION forming part of Letters Patent No. 346,703, dated August 3, 1886.

Application filed April 12, 1886. Serial No. 198,532. (No model.)

*To all whom it may concern:*

Be it known that I, CHICHESTER A. BELL, residing at 128 Gower Street, London, W. C., in the county of Middlesex and Kingdom of England, have invented certain Improvements in Systems of Telephonic Communication, of which the following is a specification.

This invention relates to the transmission of speech electrically between stations distant from one another by means of variable resistance-transmitting instruments actuated by a common voltaic battery placed at a central station.

My plan of operation differs materially from the arrangement ordinarily employed, and tends to economy in battery-power and simplicity in construction and manipulation. Heretofore each sub-station has been provided with a transmitting-telephone in which the current of a local battery, varied in strength by the impact of the sound-waves produced by the voice, acting through the medium of a vibratory plate on a variable resistance included in the circuit, is passed through the primary coil of an inductorium, the secondary coil thereof being connected in circuit with and forming part of the line. The induction-coil has been so employed, as it has been considered impracticable to vary the comparatively-high resistance of a line-circuit by the action of the voice on a single transmitter sufficiently to reproduce with accuracy articulate sounds of the requisite strength or volume. The necessary variation of the current has therefore been effected in a short primary circuit, and the induced currents thereby generated in the secondary coil have been made the actual medium of communication. The employment of the inductorium in this capacity has necessitated the use of a battery at every sub station. To obviate this necessity and to confine the batteries to central stations, reducing materially their cost by greatly diminishing the number of cells required, and at the same time to retain the batteries which are actually in use under the care and supervision of the attendants at the central station, is the primary object of this invention.

It is quite evident that when each sub-station has a battery of its own the said battery is lying idle for a great portion of the time; but by my invention the batteries may be in constant use, now in connection with one or more pairs or groups of circuits, and now with others; hence a small number of cells may take the place of a much larger number operated in the ordinary way. For the attainment of this object my invention comprises a novel arrangement of telephonic circuits and a combination of the said circuits with a main battery and certain resistances in such a way that a portion of the current of said battery may be varied by any individual transmitter, and the variations so produced be propagated to a receiver connected with any desired second line without interfering with any undesired line.

It further consists in combining the said circuit arrangements with a switch-board or commutator for use in a telephone-exchange system.

My invention contemplates a central station connected as usual with any desired number of radial telephone-lines, each of which extends from the said central point to one or more sub-stations, where a variable medium transmitter and receiving-telephone are included in the main circuit. During the periods of conversation between any two lines a voltaic battery is connected in branch circuit to the pair of united lines, and the current of the same pervading both lines, energizes both transmitters, and is itself varied in strength by the operation of either transmitter. A suitable resistance is included in the battery branch circuit between the point of union of the two lines and the battery, and the same battery may be connected with a larger number of pairs of united lines, the communications passing between the stations of each pair being totally exempt from interference due to the operation of the others, provided that a suitable resistance be included between each pair of united circuits and the battery branch. In such systems the transmitter preferably has a comparatively high initial resistance.

I am aware that it has heretofore been proposed to centralize transmitter-batteries, and that inventions tending to that end have been patented. As a due acknowledgment of the state of the art, I here refer to the patents granted, respectively, to Charles E. Scribner, No. 243,165, dated June 21, 1881, and to George Lee Anders, No. 252,986, dated January 31, 1882. The former case, however, refers to transmitters provided with the usual induction-coil, while the latter case describes exclusively a plan in which the central-office battery is included in direct circuit between the connected lines.

For the better comprehension of my invention I will now describe the same in detail, reference being made to the accompanying drawings, in which—

Figures 1 and 2 are diagrams representing successive steps illustrating the principle. Fig. 3 is a diagram showing a number of circuits connected in accordance with the terms of my invention; and Fig. 4 is a diagram showing the application of the said invention to a telephone-exchange system.

The plan which I am about to describe for working any number of telephonic circuits from a single battery in a central station is applicable to all transmitters of high or comparatively high resistance, which operate by effecting considerable variation in that resistance, but more especially to such instruments as the jet-transmitter with platinum electrodes and a jet of highly diluted sulphuric acid, described in Letters Patent issued to me February 16, 1886, and numbered 336,031.

Referring now to Fig. 1, B is a main battery of high electro-motive force, but of low internal resistance, one pole of which is grounded at G. From the other pole extends a main wire, $d$, to which two telephone-lines, $a$ and $a'$, are respectively connected. Each of these lines connects at a distant station with a main line transmitter, D and E, and a receiving-telephone, D' and E', and the circuit of each line, after passing these instruments, connects with a ground-wire, $s$. If two such transmitters, D and E, each provided, as shown, with the receiving-telephone in the same circuit, D' and E', be connected, as in Fig. 1, on one side with earth direct and on the other through the respective line-wires $a$ and $a'$ to one pole of a battery, B, at a central station, the said battery being, as already indicated, of high electro-motive force, but of low internal resistance, it is found that vibrations communicated to either transmitter will not be transmitted to and reproduced by the receiving-instrument of the other line. This holds good irrespective of the resistances of the lines $a$ and $a'$, and even if the original vibrations be of so radical a nature as to be absolutely a succession of makes and breaks of the circuit. This is readily understood, if we consider that under these circumstances changes in the resistance of the transmitter cause disturbance in the electric condition of the circuit, and that equilibrium is re-established through the battery and earth at the central station rather than through the second line and transmitter. In other words, the battery and earth at the central station act as a shunt of resistance so small as to be practically ignored.

Referring now to Fig. 2, it will be seen that the elements are identical with those of Fig. 1, with the following exceptions: that a resistance, R, is inserted between the point where the two lines $a$ $a'$ meet and the pole of the battery. This, however, materially changes the conditions. The shunt at the central office is no longer one of no resistance, and the electric disturbances originating in one transmitter (D for example) are propagated along the line $b$ to the central station, are partly expended through the battery to earth, and partly along the line $b'$ through the transmitter E and to the telephone E', in which they become audible. The extent of disturbance transmitted to E' will depend on the relative resistances of R and of the line and instruments $b$, E, E', $s$, and G, and it is very easy to make the resistance R so high that practically the whole of the electrical disturbances created by the operation of the transmitter D on the line $b$ are transmitted to E'. The insertion of the resistance R naturally results in diminishing the totality of current supplied to the lines $b$ and $b'$ and the transmitters D and E; but this is readily compensated for by increasing the electro-motive force of the battery—i. e., by increasing the number of cells. The resistance R may be of any desired character—for example, a short length of any material of inferior electrical conductivity, or a rheostat comprising a coil or series of coils of any kind of fine insulated wire. Iron wire is well suited for the purpose.

Although in Fig. 2 I have shown but two lines brought into connection at a central station with the vitalizing-battery and resistance in branch circuit, as described, it should be noted that I do not restrict myself to that number. Three or more lines may be connected in a similar way without impairing the efficiency of the system; and I desire to be understood throughout this specification that statements made applying to a pair of lines will apply also to a greater number.

The amount of resistance R in short lines (such as ordinary city lines) may be varied within wide limits without appreciably affecting the action of the transmitter D on the receiving-telephone E'. Experiment shows that it may be varied from two thousand to eight thousand ohms with the high-resistance jet-transmitters described in the Patent No. 336,081, hereinbefore cited, which offer a resistance of one thousand ohms.

It is desirable in practice to make the resistance R adjustable in the same manner as the well-known rheostat, as it may then be varied from time to time to compensate for hygrometrical variations.

Fig. 3 shows a number of pairs of sub-station lines connected with the same main battery, B, each pair having a resistance, R, between the junction of the two lines and the battery, precisely as in Fig. 2. I have, moreover, shown in Fig. 3 one group consisting of three lines, $d$, $d'$, and $d^2$, connected with one another and with the same battery and resistance $R^3$, since the principle upon which this invention is based is equally applicable to groups of two, three, or more lines.

Referring to Fig. 3 it will be found that a second pair or group of sub-station transmitting and receiving telephones, F F' and H H', connected, as shown, through a second resistance, R', and lines $b$ and $b'$, will be in its operation totally free from interference with the lines and instruments of the first pair or group, and that subscribers at D and E may carry on a conversation together at the same time that F and H are conversing without either pair overhearing the other. Such is also the case with respect to sub-stations at I and J K and L and M, and any number of others. Owing to the high resistance of each transmitter only a very small quantity of electricity flows through it. Consequently with well insulated lines a very large number of pairs of transmitters may be worked from one battery of suitably low resistance. This particular plan of working transmitters without induction-coils has other advantages. If a pair of transmitters at outlying stations be connected through an independent battery at the central station—that is, with the battery in direct circuit between the two lines—the electro-motive force or number of cells of such battery must of necessity be double that of the single battery hereinbefore described. Furthermore, when so connected, if the transmitters are of unequal resistance, the subscriber at the low-resistance end will not be so well heard as the subscriber at the high-resistance end. In practice I have found that two transmitters connected, as hereinbefore described, with one pole of a battery work as well as when a battery of double the electro-motive force is in direct circuit with both. I have also found that two transmitters having electrodes of different sizes, which do not work well when put in direct circuit with a battery, work perfectly when joined to one pole of a battery through a very high resistance. Finally, in this system a high-resistance transmitter may be put in circuit either with another high-resistance transmitter or with the ordinary induction-instruments without changing the battery.

Fig. 4 illustrates a plan of central-station connecting devices arranged for practical operation in accordance with my invention. A switch-board, S B, is placed at the central station, the form shown being that of the well-known "universal switch" or "Swiss commutator," which is composed of vertical and horizontal bars, which, however, are not in contact with one another, except when metallic plugs are inserted in the holes at each point of intersection. It will be understood that any other form of switch-board may be adopted without departing from the spirit of the invention.

The vertical bars N are connected with the respective line-wires 2, 3, 4, 5, 6, and 7, and the horizontal bars 8, 9, and 10 are for the purpose of connecting any two or more lines together. The transverse or horizontal bars are connected through separate resistances R', R², and R³, which are preferably adjustable, and by a wire, $m$, to the battery B. Each of the lines 2, 3, 4, &c., proceed from the switch-board at the central stations, at each of which is placed a direct-circuit transmitter and a telephone-receiver, the lines being finally terminated by ground-wires $s$ at G. The vertical switch-board bars N each constitute normally-open branches of the line-circuits to which they are attached, and are only operative when their respective lines are connected for conversation. To serve as a suitable call-receiving arrangement, I provide, however, for the several main lines normal central-office branch terminals $3^a$ $4^a$ $5^a$, &c., each of which extends from a split-plug socket, $e'$, (half of which is attached to the main and the other half to the branch line,) through a correspondingly-numbered annunciator to a common earth-plate. One vertical switch-board bar, I, is united to a branch wire, I, leading through the central-office transmitter $t$, receiver $t'$, and ground-wire $s$ to earth. Normally, when the lines are all at rest the plug connectors are all in place in the sockets $e'$, and the main lines are thus continued at the central station through the annunciator-extensions to earth. For an ordinary telephone-exchange the resistances, as hereinbefore stated, may be from two thousand ohms upward, as circumstances may require. The battery must have large plates, and an electro-motive force, of from thirty to forty volts, (about twenty medium-sized secondary cells will answer admirably.) The required electro-motive force will, however, depend on the resistance of the transmitter employed. Any kind of battery that does not run down or exhaust itself on open circuit may be used, the essential condition being that the resistance thereof must be very low, not exceeding a few ohms. To talk from the central station with any sub-station it is only necessary to withdraw the plug $p$ of the bar representing that station from its normal socket $e'$, to insert it in the hole at the intersection of the same vertical bar with any one of the transverse bars, and to insert the plug $p$ of the vertical bar I, representing the central-station outfit at the intersection of the said bar I with the same transverse bar. This is illustrated in the drawings, the sub-station line 3 being connected with the central-office telephones on the middle transverse bar, 9. Conversation can thus be readily maintained between the central station and any sub-station, and, if more convenient, an ordinary induction-transmitter may be employed, as it is not essential to the operation of the system that both transmitters shall be of the direct-circuit type. To connect two or more sub-station lines, the plugs of the desired lines are drawn from their respective normal sockets and inserted at the intersections of their respective vertical bars with some one of the transverse bars. The lines 2 and 6 are in the drawings shown as being joined through the bar 8. The lines 4, 5, and 7 are shown as being at rest, their plug-connectors $p$ being in their normal position. It is, of course, obvious that instead of grounding one pole of the battery, I may connect it by a return-wire with the distant terminal of all the line-wires, and that my invention includes such an obvious modification.

Having now described my invention and the way in which I operate the same, I claim—

1. A system of telephonic transmission in which the transmitters of the several lines are energized by a single battery, the said battery being located at a central point and connected in branch or derived circuit with any pair or series of pairs, sets, or groups of lines united for the purpose of telephonic intercommunication, whereby induction-coils and local batteries may be dispensed with, as described.

2. A system of telephonic intercommunication in which the transmitters at sub-stations connected with line-wires centering at a common central point, are energized by a voltaic battery located at the said central point and connected in branch or derived circuit with any pair or group or series of pairs or groups of lines, a resistance being interposed between each of the said pairs or groups of lines and the said battery, substantially as hereinbefore described.

3. In a system of telephonic transmission, the combination of a pair or greater number of telephone main lines, telephone transmitters and receivers included directly in the circuit of the said lines, and a battery connected in branch circuit with the said lines to energize the transmitters, substantially as hereinbefore described.

4. The combination, substantially as hereinbefore described, of a pair or group of telephonic main lines, variable-resistance telephone-transmitters included in the circuit of each line, a battery connected in branch or derived circuit with the said lines, and a resistance interposed between the said battery and the junction-point of the said main lines.

5. The combination of a telephone-circuit having three or more branches, each provided with a separate ground-terminal, two or more of which branches include direct-circuit transmitting and receiving telephones, and the remaining branch including a battery and resistance, the said resistance being interposed between the battery and the junction-point of the battery branch with the other two, substantially as hereinbefore described.

6. In a system of telephonic intercommunication, a series of sets of telephone-lines, variable-resistance telephonic transmitters included directly in circuit at the stations upon the said lines, a receiving-telephone also at each station, a battery at the central station having one pole connected with the earth, or with a return-wire, and having its other pole connected by branch circuits with each pair of lines, and a suitable resistance, as indicated, included between each set of lines and the said battery, substantially as and for the purposes specified.

7. In a system of telephonic circuits, one or more groups of telephonic line-circuits, and telephonic transmitters and receivers included directly in the said line-circuits at the sub-stations thereof, combined with a battery of low internal resistance but high electro-motive force located at a central station, one pole of which battery is grounded and the other joined by branches to each of the said groups of line-circuits, and a high resistance—such as an adjustable rheostat—for each separate group of lines interposed between the said pairs and the battery, whereby the said several groups are placed in communication, substantially as described.

8. The combination, in a telephone-exchange system, of a series of telephone-lines radiating from a central station to a series of sub-stations, a variable-resistance transmitter and a receiving-telephone included directly in the circuit of each of the said lines, a battery at the central station with one of its poles connected to a ground or return wire, and having its other pole branched, as described, a rheostat or other suitable resistance included in each of the said battery-branches, and switching devices, whereby any two or more of the said circuit-lines may be connected to one another, and also to one of the said battery-branches, substantially as herein specified, and for the purposes set forth.

9. The combination, in a telephone-exchange system, of a series of telephone-lines, each extending between one or more sub-stations and a central station, a variable-resistance transmitter adapted to be included directly in the main circuit, (independently of an induction-coil,) and a receiving-telephone at each sub-station, a series of earth-branches, each including an annunciator at the central station, one for each of the said lines, and normally united thereto, a central-station branch-circuit including telephones, a battery at the central station having one of its poles grounded and the other pole connected with a series of normally-open branches, a rheostat or other suitable resistance included in each of the said battery-branches, and means, as indicated, comprising a suitable switch-board and connecting-plugs, or their equivalents, whereby the several line-circuits may be transferred from their normal annunciator-terminals and be connected in pairs or sets with one another, or with the central-station telephones, and also with one of the said battery-branches, whereby a single battery may be utilized for any number of direct-acting transmitters without interference, substantially as hereinbefore described.

In testimony whereof I have signed my name to this specification in the presence of two subscribing witnesses.

CHICHESTER A. BELL.

Witnesses:
RICHD. T. PLIMPTON,
SAMUEL RIDEAL.